United States Patent [19]
Lydiard et al.

[11] Patent Number: 5,407,301
[45] Date of Patent: Apr. 18, 1995

[54] OIL SPILL RECOVERY SYSTEM

[75] Inventors: Alan K. Lydiard, Exeter, N.H.;
Dwight W. Reynolds, Portland, Me.

[73] Assignee: Petroleum Recovery Technologies, Inc., Hampton, N.H.

[21] Appl. No.: 991,313

[22] Filed: Dec. 16, 1992

[51] Int. Cl.6 .............................................. E02B 15/04
[52] U.S. Cl. .................................. 405/66; 210/242.3; 405/60; 405/63
[58] Field of Search ..................... 405/63–72, 405/60; 210/242.3; 124/57

[56] References Cited

U.S. PATENT DOCUMENTS

| 2,375,314 | 5/1945 | Mills | 124/57 |
| 2,964,031 | 12/1960 | Dotson | 124/57 |
| 3,369,609 | 2/1968 | Fogelgren | 124/57 X |
| 3,788,079 | 1/1974 | Kirk et al. | |
| 5,004,372 | 4/1991 | Dickie et al. | 405/63 |
| 5,064,310 | 11/1991 | Sullivan | 405/63 X |
| 5,066,164 | 11/1991 | Tomosy | 405/63 X |
| 5,071,287 | 12/1991 | Wallace | 405/63 X |
| 5,071,545 | 12/1991 | Ashtary | 405/66 X |
| 5,078,117 | 1/1992 | Cover | 124/57 X |
| 5,135,325 | 8/1992 | Eddy | 405/66 |
| 5,146,996 | 9/1992 | Gainer | 405/66 X |

FOREIGN PATENT DOCUMENTS

2231281 11/1990 United Kingdom .................. 405/66

Primary Examiner—Dennis L. Taylor
Attorney, Agent, or Firm—Hayes, Soloway, Hennessey, Grossman & Hage

[57] ABSTRACT

A system for deploying a cover over an oil spill, to collect the spilled oil, uses a plurality of gas propelled rockets are attached to lines arranged around the periphery of the cover. Outward projection of the rockets spreads the cover, the weight of the expended rockets then pulling the edges of the cover below the water surface to trap the covered oil. Attitude detectors are preferably employed for preventing firing of the rockets when the rocket platform is not generally level.

8 Claims, 8 Drawing Sheets

OIL SPILL RECOVERY SYSTEM

The present invention is directed to oil spill recovery systems which can be rapidly deployed to confine and collect oil and other liquids floating on the surface of a body of water for subsequent disposal by suitable recovery systems.

BACKGROUND OF THE INVENTION

In the recovery of oil spills, it is essential that recovery operations begin as soon as possible after the spill. For this purpose new U.S. Coast Guard regulations require that oil tankers have available adequate systems for recovering all oil which could be released in the event of a spill. Such systems must be rapidly deployable and capable of operating in a fool-proof and safe manner to capture the maximum amount of oil floating on the surface of the water in the vicinity of the oil spill.

One proposed system for recovering spilled oil is described in U.S. Pat. No. 3,788,079 issued Jan. 29, 1974 to Kirk and Reynolds. This '079 patent describes a system wherein a cover is deployed over an oil spill by spreading it horizontally over the;spill. In this system weights attached to lines connected to the periphery of the cover are propelled outwardly by an explosive charge. This system has a number of disadvantages, not the least of which is the tremendous fire hazard potentially created when a large explosive charge is detonated in the vicinity of an oil spill. Another disadvantage is the difficulty of assuring that all of the explosively propelled weights are discharged outwardly at the same time with the same velocity to assure uniform deployment of the cover by the outwardly propelled weights.

BRIEF SUMMARY OF THE INVENTION

The present invention is directed to an improved deployment system for a cover which is used to entrap floating oil. In a preferred form of the invention, the cover is deployed by gas propelled rockets which use, as a motor force, high pressure gas confined by the rockets. Such a system has the advantage that no explosive flames are created to activate the system or to provide the propelling force. The rockets are independently propelled and can, themselves, act as weights necessary to draw the edges of the deployed cover below the surface of the water to entrap the covered oil slick. Other novel features of the invention are the systems for holding the cover, venting the cover and storing the cover during initial deployment of the support carrying the cover with automatic release of the storage means as a result of the firing of cover deployment rockets.

Additionally, the preferred form of the invention involves means for assuring that the cover deploying rockets are activated only when they are in proper position to fully deploy the cover.

DETAILED DESCRIPTION OF THE INVENTION

In order that the invention may be more fully understood, reference should be had to the following detailed description taken in connection with the following drawings.

DETAILED DESCRIPTION OF THE DRAWINGS

Figure 1:
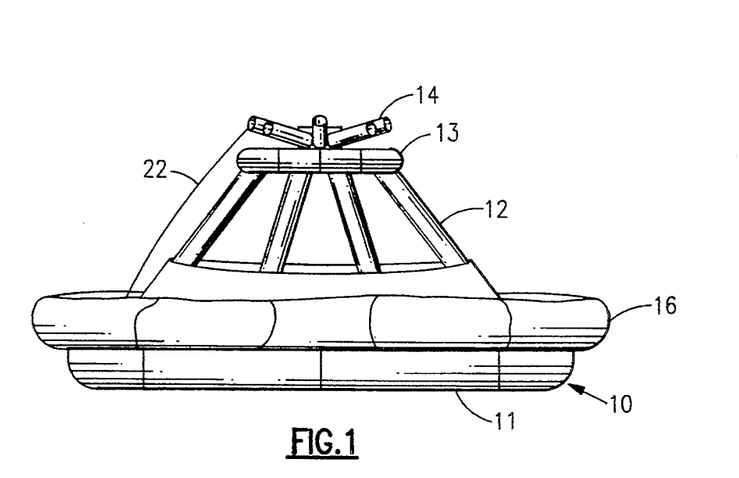
FIG. 1 is a diagramatic side view of an inflated raft showing the cover before deployment held in a pocket with the firing tubes mounted above an inflated tower.
Figure 2:
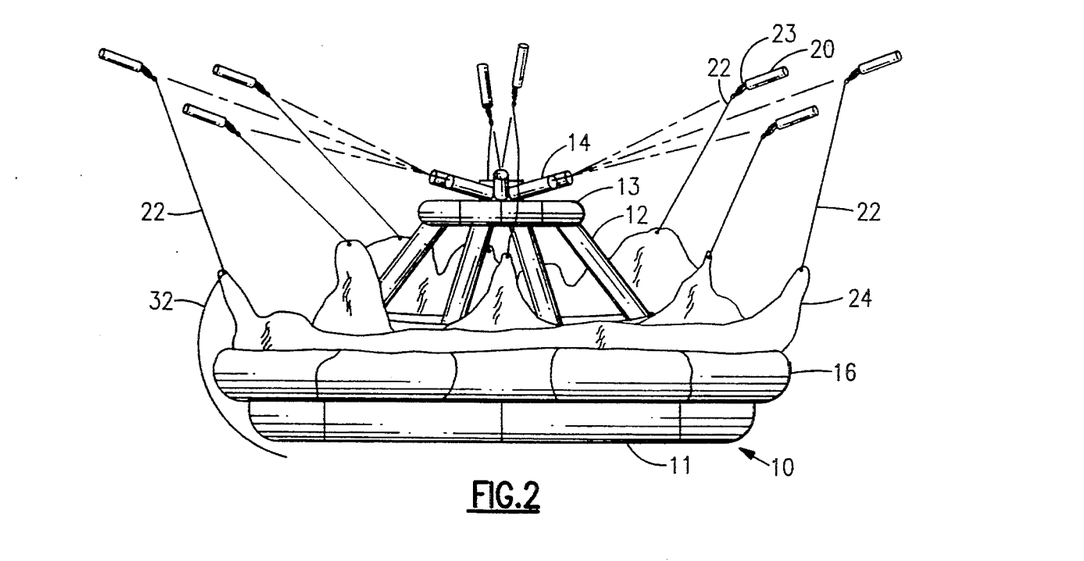
FIG. 2 shows the raft immediately after firing of the rockets, showing the initial stages of deployment of the cover.
Figure 3:
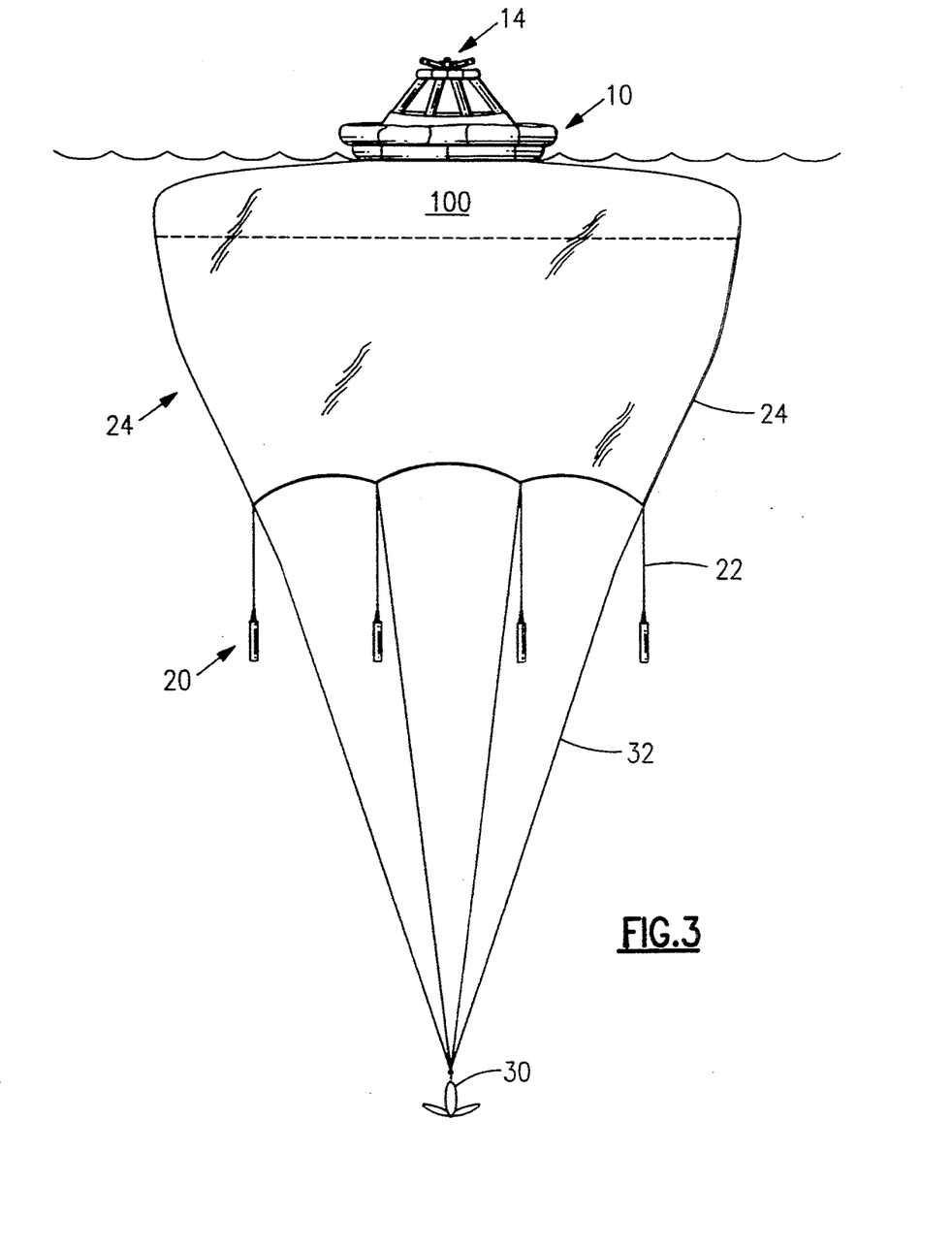
FIG. 3 shows the raft with the cover deployed, the anchor released and oil entrapped.

Referring now to FIGS. 1, 2 and 3, there is shown a diagramatic side view of the present invention illustrating the raft, the cover and the firing mechanism for deploying the cover.

In FIG. 1, the raft 10 is generally shown as an inflatable tubular ring 11 having an inflatable tower 12 which has a plurality of legs which support an inflatable upper platform 13. The rocket firing tubes 14 are carried by the platform 13. Lines 22 connect each rocket to an outer peripheral portion of the deployable cover. In a preferred embodiment of the invention, there are eight gas rockets, each connected to one of eight spaced points around the periphery of the cover. Only one of the deploying lines 22 is illustrated, being schematically shown as leading to the Cover which is contained in the pocket 16.

In FIG. 2, the device is shown immediately after firing of all of the rockets 20 showing the cover 24 being pulled out of the pocket 16.

In FIG. 3, the cover has been fully deployed and has trapped a mass of oil 100 under the deployed cover. As shown in this FIG. 3, an anchor 30 has been released and is attached, by means of lines 32, to equally spaced points around the perimeter of the cover. The anchor thus tends to pull the periphery of edges of the cover together.

Figure 4A:
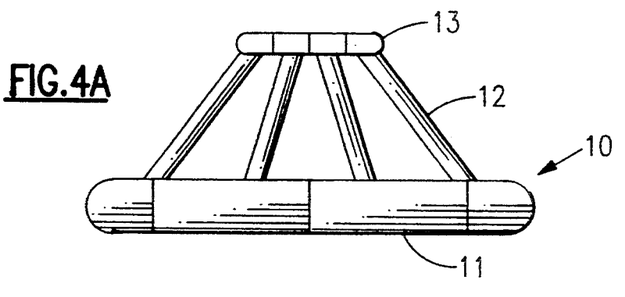
FIGS. 4A and 4B show side and top views, respectively, of the inflated raft with the inflatable platform.
Figure 4B:
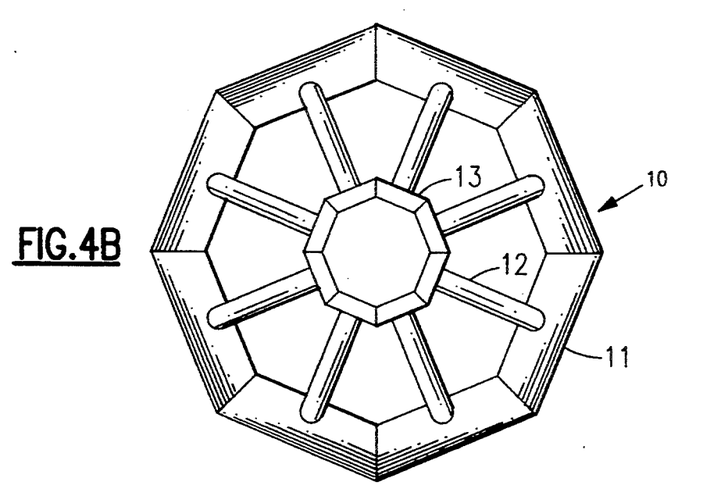

Referring now to FIG. 4, there are shown plan and side views of the inflatable support 10 illustrating the eight individual tubes 11, the legs 12 and the platform 13 without any of the other equipment.

Figure 5:
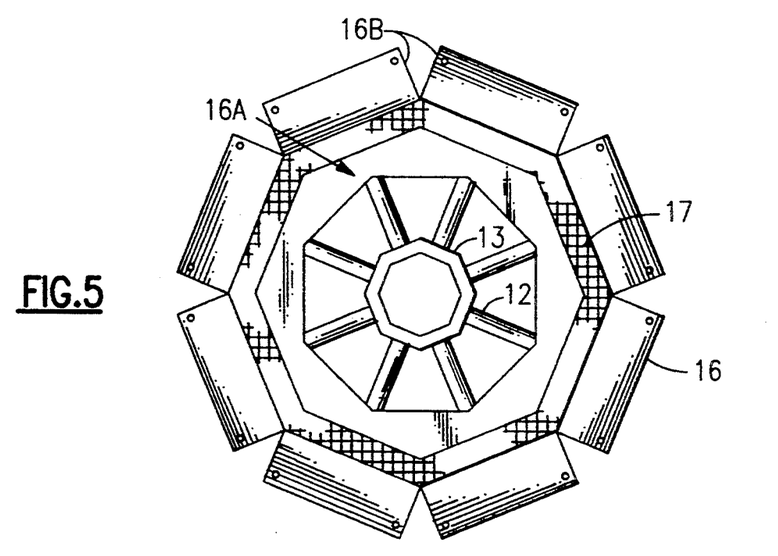
FIG. 5 is a plan view showing the pockets for holding the cover, the pocket backing and the air vent for releasing air from under the deployed cover. (For clarity, the cover is not shown)

In FIG. 5, there is a plan view showing the opened pockets 16, the vents 17, the pocket backing 16A, all of which secure the deployable cover (not shown). These pocket covers are held together by hook and loop tabs 16B (of the type sold by Velcro) which are released during the deployment of the cover.

Figure 6:
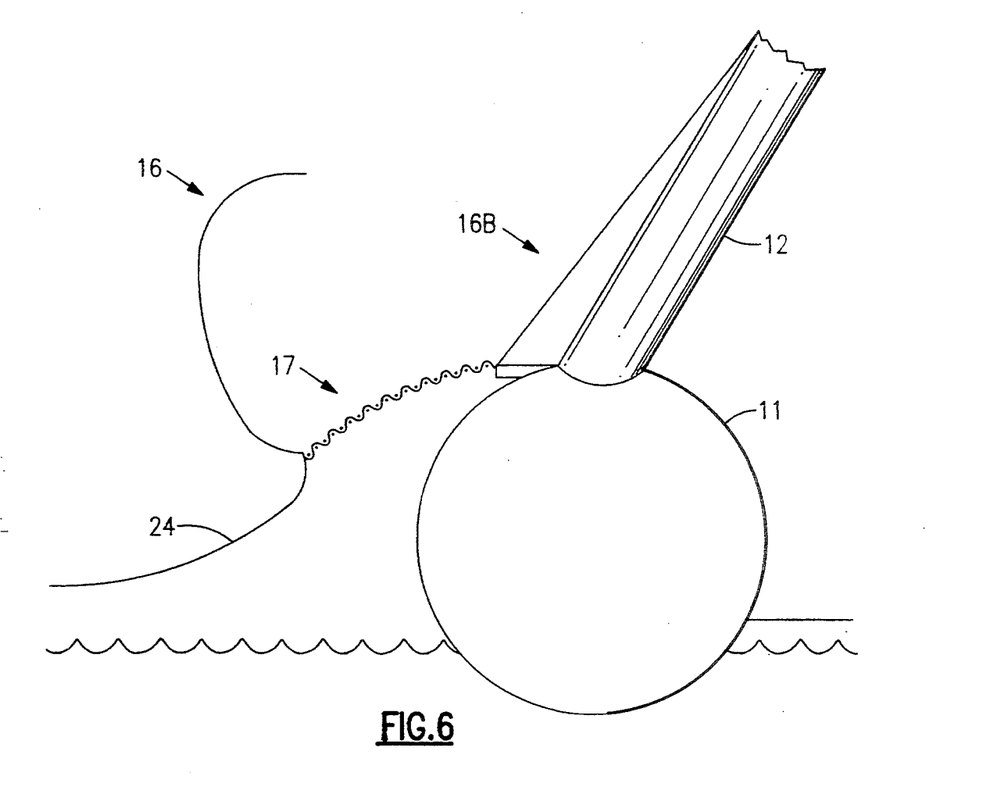
FIG. 6 is a schematic partial sectional view showing a portion of the inflatable support, the vent, the pocket backing and a portion of the deployed cover.

In FIG. 6, there is a diagramatic sectional view showing a cylindrical tube 11 and a leg 12. The pocket backing is shown at 16A and the pocket, partially opened, is shown at 16. A portion of the cover 24 is shown as being fully deployed. AS can be seen, the vent 17 is held above the water line by the cylindrical tube 11. Thus, when the cover has been fully deployed the air trapped under the cover can vent rapidly through the vent 17 so that the deployed device has a minimal protrusion above the water line.

Figure 7A:
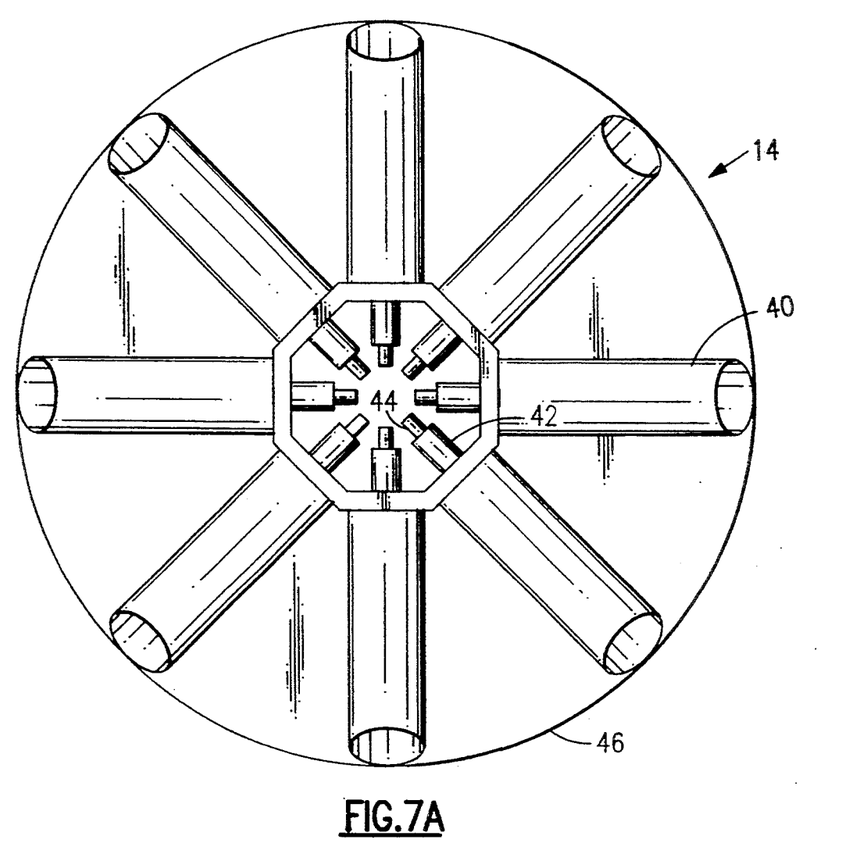
FIGS. 7A and 7B are, respectively, top and side views of the rocket firing tube assembly.
Figure 7B:
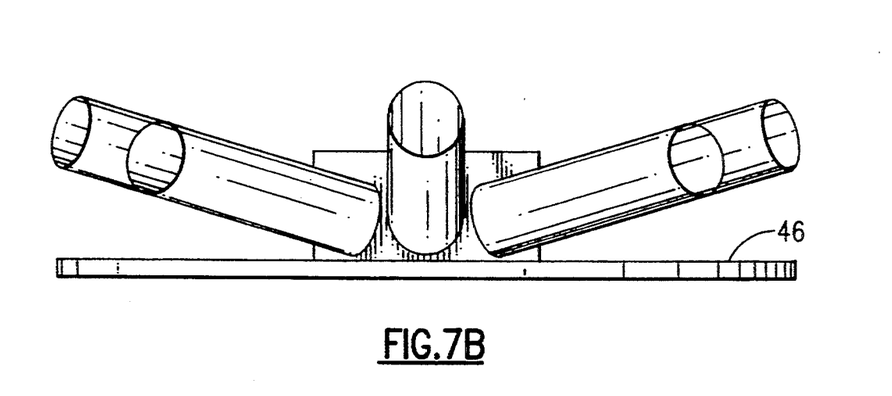

Referring now to FIGS. 7A and 7B, there are shown schematic top plan and side views of the firing system 14 illustrating a plurality of tubes 40 which are to hold the rockets, each tube having a firing mechanism 42 and a rocket triggering mechanism 44 mounted on the inner ends thereof. As noted from FIGS. 7A and 7B, these tubes all project upwardly at a slight upward angle, on the order of 12°, from a plate 46.

Figure 8:
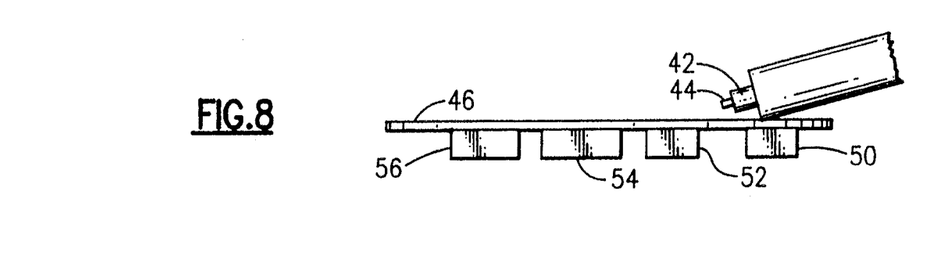
FIG. 8 shows a schematic sectional view of the power supply, control and the various sensors used for determining the proper time of firing.

In FIG. 8, there is schematically shown a fire control mechanism which is carried by the plate 46 which preferably supports the firing tubes 40. This control system consists of an x-motion sensor 50, a y-motion sensor 52 and an accelerometer 56. The motions sensed by these devices are fed to a power supply and control system 54. All of these are standard, commercially available items, preferred embodiments of the devices being described later in the specification.

Figure 9:
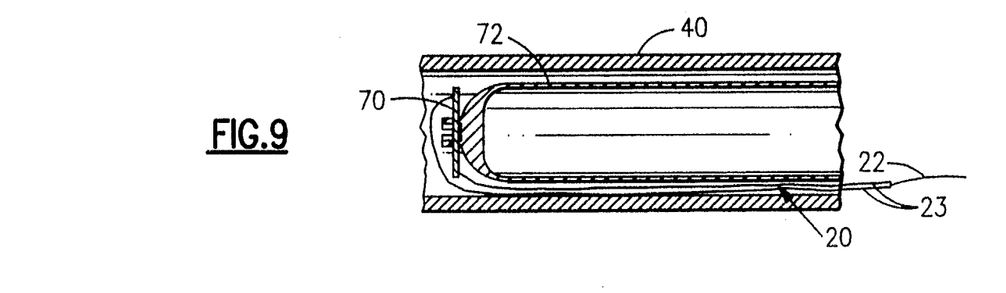
FIG. 9 is a diagramatic view showing the arrangement of the bridle attached to the gas cylinder for deploying the cover when the gas rocket is activated.

In now to FIG. 9, there is shown a schematic diagramatic sectional view of a gas cylinder 72 which serves as the gas rocket. This cylinder carries a washer 70 at its rear end, this washer being connected to a bridle 23 which in turn is connected to the deployment lines 22 for deploying the cover 24 (see FIG. 2).

Figure 10:
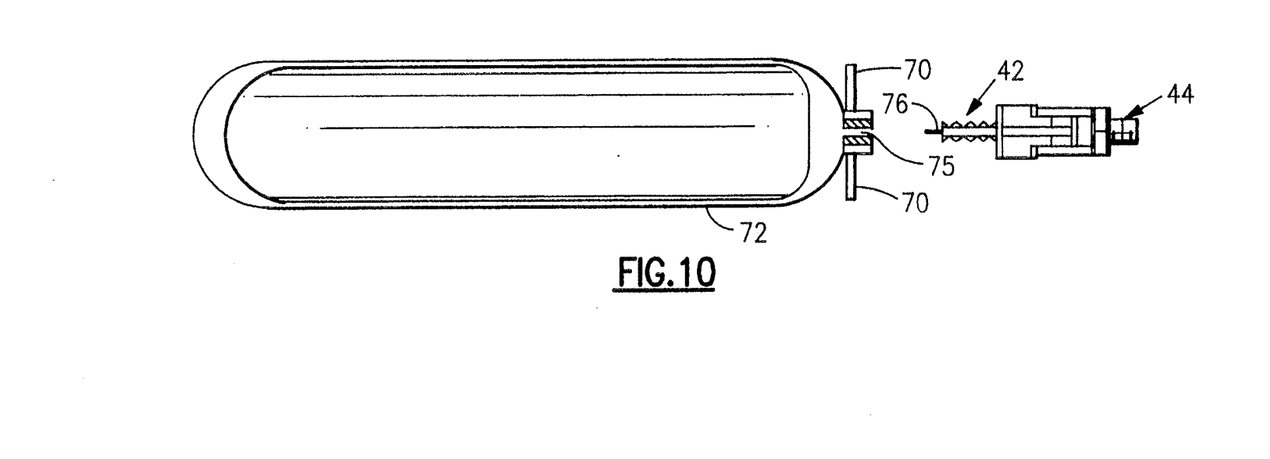
FIG. 10 is a diagramatic schematic, partially cut away, drawing showing the arrangement of the firing mechanism for rupturing the disk which activates the rocket.

Referring now to FIG. 10, there is illustrated a detail of the gas rocket preferably employed in the present invention. This shows the location of a burst disk 75 which is to be ruptured by a cutter 76 carried on the end of a firing mechanism 42 which is activated by an ignitor 44.

As soon as an oil spill is encountered, the inflatable support is deployed over the spill. Dispersal of the system can be accomplished by dropping it from the side of the ship or towing it away from the side of the ship before deployment of the cover. Equally it can be dispersed from another vessel or from an aircraft.

Figure 11:
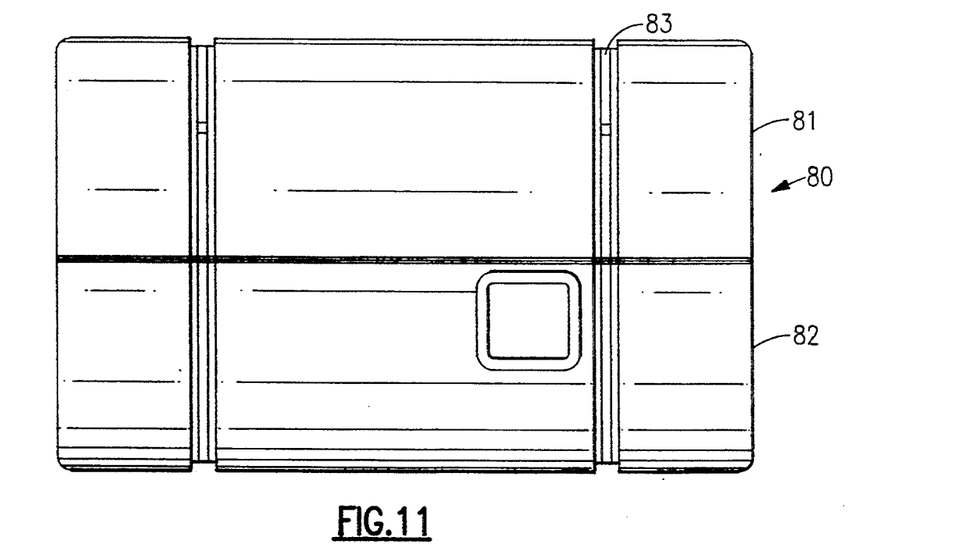
FIG. 11 is a side view of the canister for holding the raft.

Normally, the device will be confined in a canister 80 (See FIGS. 11 & 12) which is adapted to fall away from the inflatable device when the capacitor is in the water and the raft starts to inflate. The activation of the inflation system is accomplished by remote control and occurs when the canister is in proper position.

Figure 12:
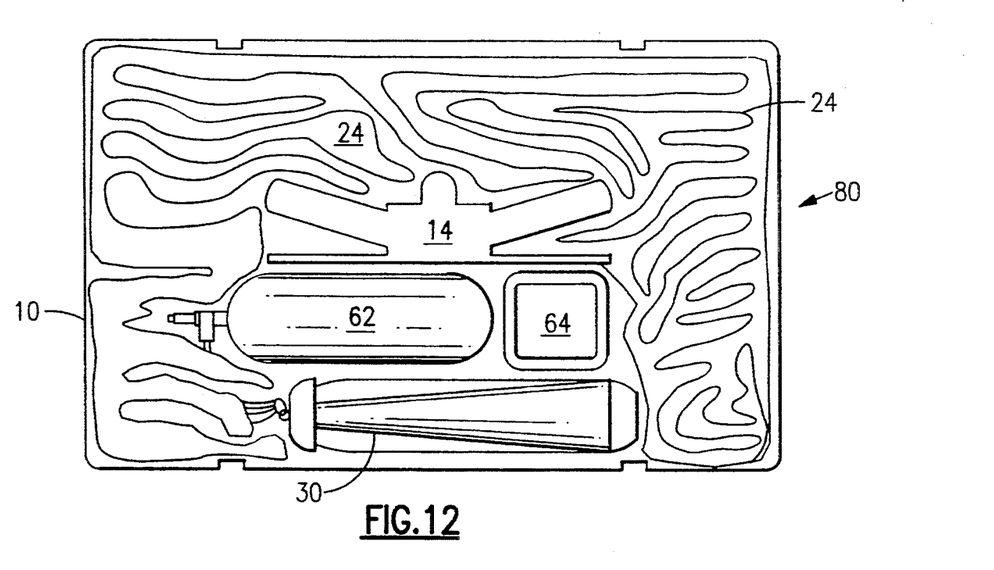
FIG. 12 is a schematic diagramatic partially sectional view of the deflated raft and cover packed in the canister for storage, ready for deployment.

As seen most clearly in FIG. 12, the raft 10 is stored in deflated condition in the canister 80 with all of the sections thereof in position to be inflated. Inflation is accomplished by a gas control and battery system 64. The anchor 3D is shown in the base 82 of the canister. The two halves of the canister are held together by breakable straps 83 which are too weak to resist the expansion force created by the inflating raft.

Figure 13:
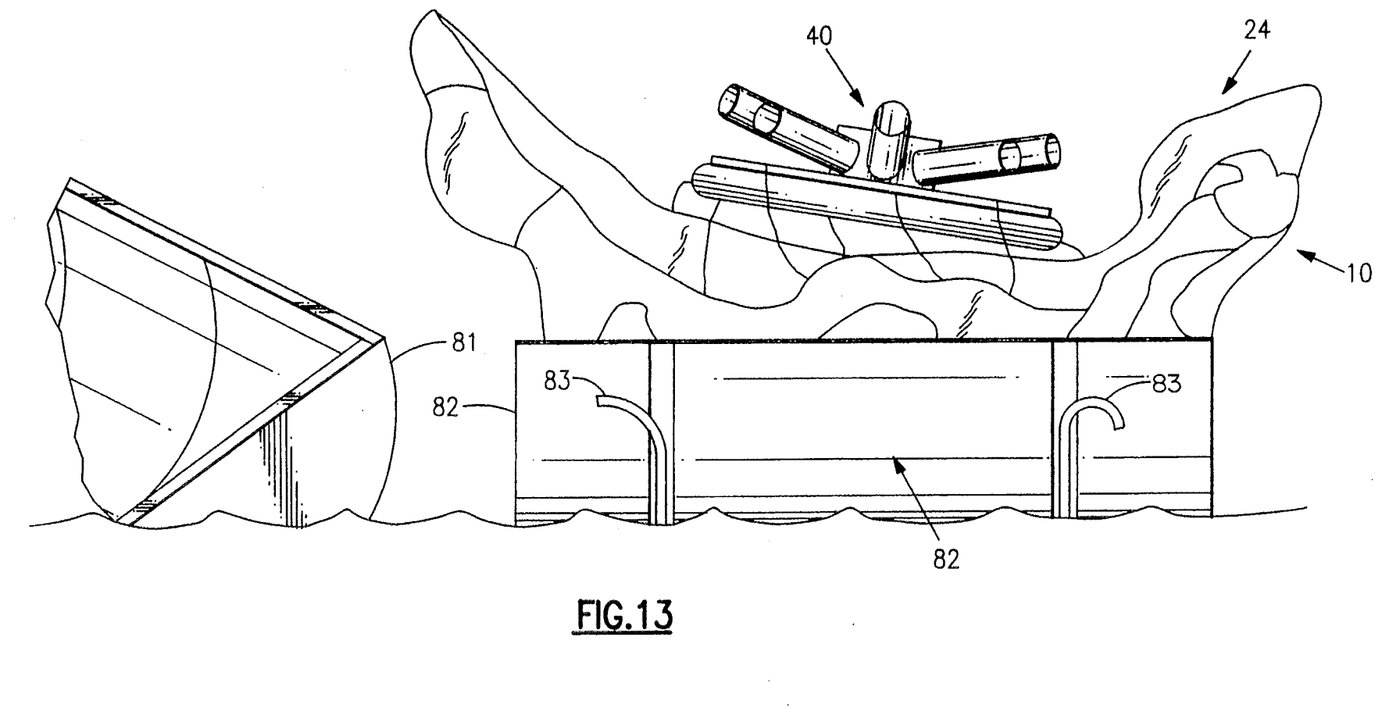
FIG. 13 is a schematic diagramatic view of the initial stages of inflation of the raft with the outer shell of the storage canister being discarded.

Inflation of the raft effectively disengages the inflatable raft from the canister 80 and will prevent the support 10 from sinking FIG. 13 shows the raft partially inflated and being ejected from the lower half 82 of the canister, this lower half not yet having sunk. The upper half 81 has been discarded and is sinking. The lower half 82 arranged to sink when the raft is fully inflated.

Once the raft has been fully inflated and is in position over an oil spill, a remote control device checks the circuits in the control to see that all circuits are functioning properly. At this point, the system for firing the gas propelled rockets is activated. This system is preferably additionally controlled by the x and y sensors which check for pitch and roll of the platform 46. In addition, the accelerometer is read to make sure that the firing takes place at the top of a wave rather than in the trough. As a result, when the platform 46 reaches the top of a wave and is level, the eight rockets will be discharged by activating the firing mechanism 44 and the puncturing mechanism 42 which propelles the cutter 76 through the burst disk 75. This releases the gas pulling the cords 22 and deploying the cover 24 in its extended pattern.

Figure 14:
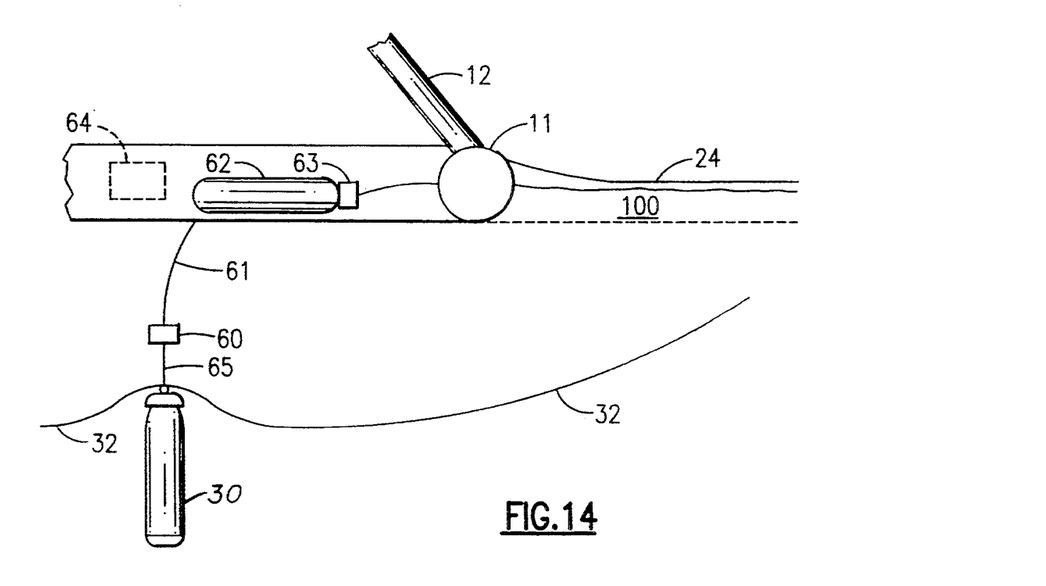
FIG. 14 shows a schematic diagrammatic partial view of the inflated raft with the cover deployed prior to releasing the anchor.

At this point the raft 10, anchor 30 and inflation cylinder 62 are in the general position shown in FIG. 14. The anchor is still retained by a yoke 61 which leads to a wire 65 supporting the anchor 30. On command a remote controlled cutter 60 severs wire 65 and releases the anchor. FIG. 14 also shows the remote controlled gas release system for the inflation cylinder 62. As seen from FIG. 14, the lower case 82 has now sunk so that the 9 anchor is free to fall to the full depth allowed by anchor line 32. If the lower case 82 has too much buoyancy, a controlled leak may be included in case 82 to provide a timed sinking. Equally, a valve timed to the inflation of the raft may permit flooding of case 82.

At this point the anchor release mechanism 60 is activated by remote control and the anchor 30 is allowed to fall. The dropping of the anchor 30 pulls on the lines 32 and draws the edges of the cover 24 down through the oil slick deep into the water to form the shape generally shown in FIG. 3. This confines the oil in a central portion of the cover underneath the raft 10.

During the operation of the deployment of the cover 24 and its collection underneath the raft, air is rapidly released from under the cover through the vent 17 which, in the preferred embodiment, preferably completely surrounds the cylinder 11. Since the vent is held above the surface of the oil and the water by the cylinder 11, oil cannot escape through this vent. After the oil has been collected, it can be retrieved from under the cover by a suitable pumping means which can be inserted under the edge of the cover or can be pushed through an opening in a portion of the vents. In a preferred embodiment of the invention, the cover 4 is preferably 1.14 ounce rip stop nylon coated on one side in orange so as to be clearly visible. The cylinder, including the legs 12 and platform 13 are made of 4.70 ounce neoprene with rip stop nylon covering. The platform 46 is preferably a 30 inch circular flattened aluminum sheet $\frac{1}{8}$th inch thick. The firing tubes are 2.610 inch ID × 11 $\frac{5}{8}$ inch long extruded aluminum tubes. The vent is preferably "texulene" 13 to 14 ounces, (a PVC Vinyl coated polyester 17×12 weave). The bridles are preferably Kevlar Aramid fibers 0.062 inch in diameter and the lines 22 are preferably 5/16 inch braided nylon. The x and y sensors are preferably normal sensors used in industry such as a Honeywell Microswitch No. 9SS. The accelerometer is a piezoelectric type available from Setra Electronics. The firing system 44, preferably is a Whittaker ordinance 4406 thruster and the penetrating mechanism 42 is a stainless steel tube with a sharp cutting edge 76 for penetrating the rupture disk 75. A similar system can be used for severing the anchor retaining wire 65. These Whittaker thrusters are completely contained and can be used in an explosive atmosphere without danger. The rupture disk is preferably an Ansel 4526 rupture disk and the cylinder is preferably filled to a pressure of 3000 psi. As a propellant compressed nitrogen is preferred. Such a filled cylinder weighs 4.6 lbs.

We claim:

1. In a system for supporting a cover to be deployed over an oil spill to recover the spilled oil the improvement wherein the cover edges are propelled outwardly from a floating support for holding the cover in folded storage condition, X and Y sensors for detecting the attitude of said support and means for controlling the deployment of said cover as a function of the detected attitude.

2. The system of claim 1 wherein said system additionally includes a sensor for detecting vertical motion of said support.

3. In a system for deploying a cover over an oil spill for recovering oil entrapped by the cover, and the cover is deployed by weights propelled outwardly from a floating platform supporting the cover, the improvement wherein an inflated peripheral support has legs extending upwardly from the peripheral support, a platform carried by the legs, a pocket for holding said cover arranged around outer ends of the support legs, and an air vent for said cover adjacent said peripheral support, the air vent being held above the level of trapped oil by means of said peripheral support, and permitting trapped air to be removed therethrough.

4. A system according to claim 3, the improvement also wherein the cover is deployed by rockets secured around the periphery of the cover, each said rocket being propelled by a supply of high pressure gas.

5. The system of claim 3 wherein said high pressure supply of gas of each said rocket comprises a rupturable disc and means are provided for rupturing said disc to fire each said rocket.

6. The system of claim 5 wherein the disc rupturing means is impelled against the disc by an explosive device when no explosive flames escape from the device.

7. A packaged system for deploying a cover over an oil spill by projecting the edges of the cover outwardly from a central inflatable support for the cover comprising a canister for containing the cover and an inflatable raft for supporting the cover, said canister having at least two separable sections, said canister being sufficiently watertight to retain the canister afloat and in an upright orientation, said canister sections being releaseable upon inflation of the support.

8. The packaged system of claim 7 wherein said canister sections are arranged to sink after deployment of the inflatable raft.

* * * * *